No. 857,812. PATENTED JUNE 25, 1907.
J. J. LEYKAUF & A. BARTH.
CULINARY UTENSIL.
APPLICATION FILED SEPT. 27, 1906.
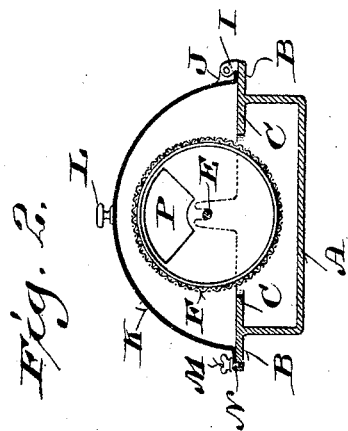
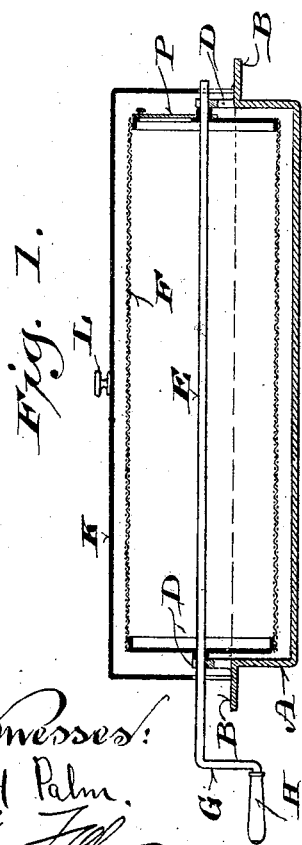
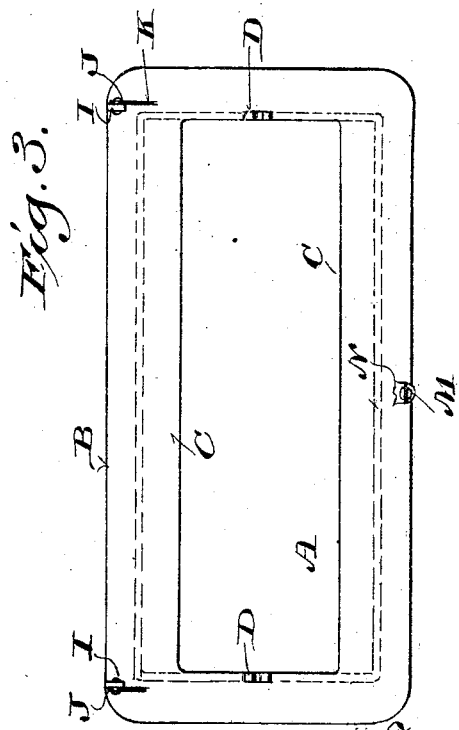

UNITED STATES PATENT OFFICE.

JOHN J. LEYKAUF AND ALFRED BARTH, OF MILWAUKEE, WISCONSIN.

CULINARY UTENSIL.

No. 857,812.  Specification of Letters Patent.  Patented June 25, 1907.

Application filed September 27, 1906. Serial No. 336,408.

*To all whom it may concern:*

Be it known that we, JOHN J. LEYKAUF and ALFRED BARTH, both citizens of the United States, and residents of Milwaukee, in the county of Milwaukee and State of Wisconsin, have invented certain new and useful Improvements in Culinary Utensils; and we do hereby declare that the following is a full, clear, and exact description thereof.

Our invention consists in what is herein shown, described and claimed; its object being to provide simple, economical culinary utensils each of which has the function of a heater or roaster.

Figure 1 of the accompanying drawings represents a vertical, longitudinal central section of a culinary utensil in accordance with our invention organized for roasting coffee, popping corn or other operation facilitated by the employment of a rotary holder for the material under treatment; Fig. 2, a transverse section of what is shown in Fig. 1, and Fig. 3, a plan view of the utensil having the major portion of its hinged cover broken away and the rotary cylindrical shell thereof removed.

Referring by letter to the drawings, A indicates a rectangular pan having an endless outer upper horizontal flange B, and upper horizontal flanges C extend inward from the sides of said pan flush with the flanges B aforesaid. At its ends the pan is provided with central upper lugs D that are notched to constitute bearings for the journal-ends of the spindle E of a cylindrical shell F hereinafter more particularly described, one end of the spindle being suitably bent to form a crank G on which a handle H is suitably secured.

The flange B of the pan is provided with side ears I and in pivotal connection with the same are ears J of a semi-cylindrical cover K for said pan and its contents, the ends of the cover being suitably notched to engage the ends of the spindle E when the rotary cylindrical shell F is in working position. A handle L is provided on the pan-cover, and the flange B of the pan is provided with a thumb-screw M or other suitable fastening device for engagement with a lip N of said cover when the latter is swung to close said pan.

The cylindrical shell comprises heads fast on the spindle E and foraminous material, wire netting or otherwise, fastened to said heads, one of these heads being provided with a suitable opening and a closure P for same. However an opening may be provided in the foraminous portion of the shell, and a closure for the same supplied in connection with said foraminous portion of said shell.

Green coffee beans or other material to be treated is poured in the shell aforesaid through the opening in same, the opening closed and said shell arranged to have the spindle F thereof supported in the bearings D for same, after which the cover K is swung to close the pan. The material in the shell is subjected to heat in the pan and said material is agitated incidental to rotary motion of said shell. The shell turns between the inner horizontal upper flanges C of the pan, and these flanges deflect the heat that would otherwise ascend without passing through said shell.

The pan may be set on top of a stove or suspended, by its flange B within the same, as most convenient or desirable in practice, and without the rotary shell aforesaid it constitutes a device in which to perform various culinary operations. The pan with its flanges, lugs and ears may be a single casting or otherwise suitably constructed from suitable material.

We claim:

1. A culinary utensil comprising a pan provided with an endless outer upper horizontal flange, upper inner flanges, flush with the one aforesaid, and notched lugs constituting bearings for the turning spindle of a cylindrical rotary roasting shell; and a semi-cylindrical cover in hinge-connection with the outer flange of the pan, said cover being provided with end notches for engagement with said spindle.

2. A culinary utensil comprising a pan having an upper outer endless flange by which to suspend the same in a stove, inner flanges flush with the one aforesaid and upper lugs notched to constitute bearings, a cylindrical shell having a cranked center spindle engageable with the bearings aforesaid, said shell being between the inner pan-flanges, and a semi-cylindrical pan-cover having end notches engageable with said spindle.

3. A culinary utensil comprising a pan provided with an endless outer upper horizontal flange, upper inner flanges, flush with the one aforesaid, and notched lugs; a rotary cylinder shell for which the lugs constitute journal-bearings between said inner pan-flanges, and a semi-cylindrical pan-cover having end notches engageable with the cylinder journals.

In testimony that we claim the foregoing we have hereunto set our hands at Milwaukee in the county of Milwaukee and State of Wisconsin in the presence of two witnesses.

JOHN J. LEYKAUF.
ALFRED BARTH.

Witnesses:
H. E. OLIPHANT,
GEORGE FELBA.